United States Patent

Perry et al.

[15] 3,648,728
[45] Mar. 14, 1972

[54] VALVE CONSTRUCTION

[72] Inventors: Max W. Perry, Hastings; Norman D. Brockelsby, Grand Island, both of Nebr.

[73] Assignee: Dutton-Lainson Company

[22] Filed: June 22, 1970

[21] Appl. No.: 48,253

[52] U.S. Cl............................................137/525, 137/535
[51] Int. Cl........................................................F16k 15/14
[58] Field of Search ................137/512.5, 525, 525.1, 525.3, 137/525.5, 535, 541

[56] References Cited

UNITED STATES PATENTS

| | | | |
|---|---|---|---|
| 1,827,100 | 10/1931 | Pardee | 137/535 X |
| 3,454,182 | 7/1969 | Morton | 137/525.3 X |
| 2,214,459 | 9/1940 | Gottlieb | 137/535 |
| 3,134,514 | 5/1964 | Booth | 137/525.3 X |
| 3,179,122 | 4/1965 | Wasdell | 137/525 X |

FOREIGN PATENTS OR APPLICATIONS

| | | | |
|---|---|---|---|
| 823,377 | 12/1951 | Germany | 137/512.5 |
| 627,605 | 6/1927 | France | 137/535 |

*Primary Examiner*—Robert G. Nilson
*Assistant Examiner*—David J. Zobkiw
*Attorney*—Molinare, Allegretti, Newitt & Witcoff

[57] ABSTRACT

A valve construction for use as a pressure relief or check valve in fluid systems or apparatus.

6 Claims, 4 Drawing Figures

Inventors:
Max W. Perry
Norman D. Brocklesby
By Molinare, Allegretti, Newitt & Witcoff
Attys.

VALVE CONSTRUCTION

BACKGROUND OF THE INVENTION

This invention relates to a valve construction which is especially suitable for use as a pressure relief or check valve of the type requiring the use of a resilient member, such as a spring, for maintaining the valve element in seated or closed position.

Heretofore valves of this type had been produced as an assembly and are usually composed of three separate elements, and also are usually formed with suitable features, such as threads or serrations, for cooperative engagement with a wall, or member of a body of the article or device, with which the valve is to be used. Sometimes such valve assemblies necessitate special machining operations to be performed on the member on which they will be mounted, in order to permit their attachment to the article. Such prior valves of this type are comparatively expensive to manufacture, and some of them consume substantial time in mounting them in an operative position on the article with which they are to be used.

One of the objects of this invention is to provide a novel valve of the character indicated, which is of simple, inexpensive, and efficient construction.

Another object is to provide a novel valve of the character indicated, which is composed of only two separate elements, which may be quickly and easily attached to a member forming a wall of a chambered body or other structure in relation to a valve port or vent opening in said member.

A further object is to provide an improved valve of the character indicated, which is composed of only two separate elements, each of which is formed of resilient, synthetic plastic material, and which is capable of use in connection with the handling of various fluids.

Other objects and advantages of this invention will be apparent from the following description, taken in connection with the accompanying drawing.

DESCRIPTION OF THE PREFERRED EMBODIMENT

Figure 1:
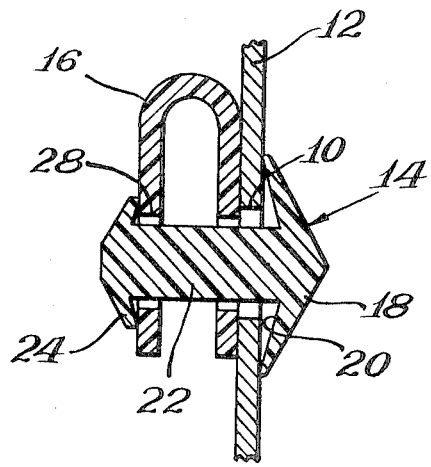
FIG. 1 is an enlarged axial-sectional view through the valve assembly embodying the present invention, shown in mounted relation to a valve port or vent opening in the wall of a member, forming a wall of a chambered body or similar structure.
Figure 3:
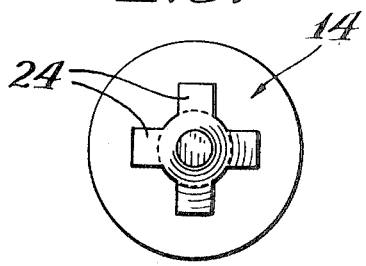
FIG. 3 is an enlarged view of the inner end of the valve element.
Figure 2:
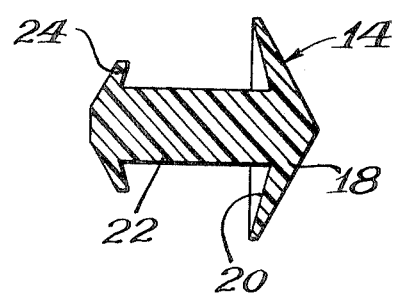
FIG. 2 is an enlarged axial-sectional view of the valve element.
Figure 4:
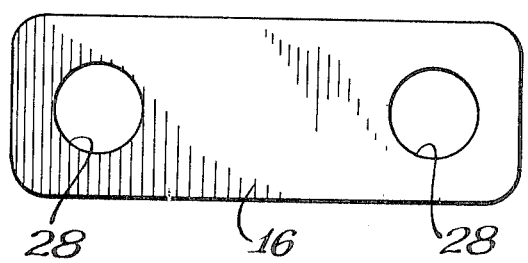
FIG. 4 is an enlarged, planned view of a resilient strap member, constituting a part of the valve assembly.

As may be seen in FIG. 1 of the drawing, the valve assembly embodying the present invention as shown affixed in operative relation to a valve port or vent opening 10, in a mounting member 12. Said mounting member 12 may be a wall or other portion of a chambered body or other structure. The valve assembly may be utilized as a pressure relief valve and/or a check valve for various fluid systems or apparatus. For example, it may be employed as a pressure relief and check valve for a hub cap construction for a wheel of a boat trailer, as disclosed in a copending application for Letters Patent of Anthony W. Molinare, Ser. No. 48,205, filed June 22, 1970, owned by the assignee of the present application. The valve assembly is composed of only two separate parts, namely a unitary valve element 14 and a yielding pressure member 16. The valve element, as shown in the drawings, is molded of suitable, yieldable, resilient synthetic plastic material, such as nylon, and includes a flattened cone-shaped valve head 18, of generally circular and conical outline, with its under surface 20 undercut so that the marginal edge of the valve head provides a thin, flexible marginal lip adapted to yieldingly contact the outer surface of the mounting member 12 in surrounding and sealing relation to the valve port or vent opening 10. The valve element has a cylindrical stem portion 22 connected at one end to the underside of the head 18, and the opposite end being formed with radially extending abutment shoulders 24, herein shown as four, which are equally spaced apart circumferentially and the outer ends of which define a diameter slightly greater than the diameter of the opening 10. The diameter of the stem 22 is smaller than the opening 10 in the member 12 so as to insure that fluid under pressure may pass freely through the opening 10 and beneath the valve head 18, and discharge beyond the lip portion of the valve head. The valve element may be quickly and easily inserted into operative relation in the opening 10 by forcing the abutment shoulders 24 through said opening.

The yielding pressure member 16 is then interposed between the abutment shoulders 24 at the inner end of the valve element, and the inner surface of the member 12. The pressure member 16 is in the shape of an elongated strap and is formed of yieldable, resilient, synthetic plastic material, such as nylon, and serves to function as a spring. The opposite ends of the strap are formed with apertures 28 of a diameter slightly greater than the diameter of the stem 22 of the valve element. The resilient strap member is adapted to be folded upon itself to provide a form similar to a hairpin, and it is placed in operative position by forcing the strap in folded form so that its apertures 28 yieldingly snap over the abutment shoulders 24 to assume the position on the stem 22 as seen in FIG. 1 of the drawing. The outer surfaces of the abutment shoulders are tapered downwardly toward the valve head to facilitate force fitting of the apertures of the strap thereover and onto the valve stem. In this position one leg of the strap member abuts against the abutment shoulders 24, while the opposite leg abuts against the inner surface of the member 12. The inherent resiliency in the strap 16 in such a bent form provides the desired pressure for yieldingly maintaining the valve head 18 seated in sealing relation to the opening 10.

The build up of a slight pressure within the chambered body sufficient to overcome the pressure of the resilient strap 16 will result in causing the fluid in the body to flow through the apertures 28 of the strap member, along the stem 22 of the valve element, and out through the opening 10 in the mounting member, and discharge beneath the marginal lip of the valve head 18. When the excess pressure within the chambered body is relieved, the yieldable strap will serve to urge the valve element inwardly to closed position, with its marginal edges seated against the outer surface of the mounting 12 in surrounding and sealing relation to the opening 10. The valve assembly also serves as a check valve to preclude ingress of material or fluid from the exterior through said opening 10 into the chambered body, of which said mounting member 12 forms a part.

What is claimed is:

1. A two piece valve construction for operative association with and controlling an opening in a mounting member, comprising a unitary valve element of resilient material having a valve head adapted to sealingly engage the outer surface of said member in surrounding relation to said opening, said valve element having a stem attached to the underside of said valve head and extending freely through said opening, said opening being of larger cross-sectional area than said stem to permit fluid under pressure to discharge along the stem and through the opening and pass beneath the valve head, said valve element having shoulder means on the opposite end of the stem having a transverse dimension greater than the size of said opening and adapted to be forcibly projected through said opening in spaced relation to the inner surface of the mounting member and separate means reacting against said shoulder means and the inner surface of said member to yieldingly maintain the valve head seated in sealing engagement with the outer surface of said member in surrounding relation to said opening.

2. A valve construction as set forth in claim 1, wherein said separate means comprises a strap member of resilient material adapted to be bent into hairpin shape with each end apertured for force fitting over said shoulder means onto the stem with one leg engaging said shoulder means and the other leg engaging the inner surface of said member.

3. A valve construction as set forth in claim 2, wherein the apertures in the strap member are larger in cross-section than the cross section of the stem to permit fluid under pressure to pass through the apertures of the strap, along the stem and through said opening in the member and discharge beneath the valve head.

4. A valve construction as set forth in claim 3, wherein said strap member is formed of synthetic plastic material.

5. A valve construction as set forth in claim 4, wherein said shoulder means comprises a plurality of circumferentially spaced apart abutments, the outer surfaces of each abutment being tapered outwardly toward the valve head to permit forcing the abutments through said opening and to facilitate force fitting of the strap member thereover onto said stem.

6. A valve construction as set forth in claim 1, wherein said unitary valve element is formed of synthetic plastic material and said valve head is undercut to form a relatively thin, flexible, marginal lip.

* * * * *